P. M. ANDERSON.
WORK HOLDER.
APPLICATION FILED AUG. 27, 1920.

1,415,855. Patented May 16, 1922.
2 SHEETS—SHEET 1.

P. M. ANDERSON.
WORK HOLDER.
APPLICATION FILED AUG. 27, 1920.
1,415,855.
Patented May 16, 1922.
2 SHEETS—SHEET 2.
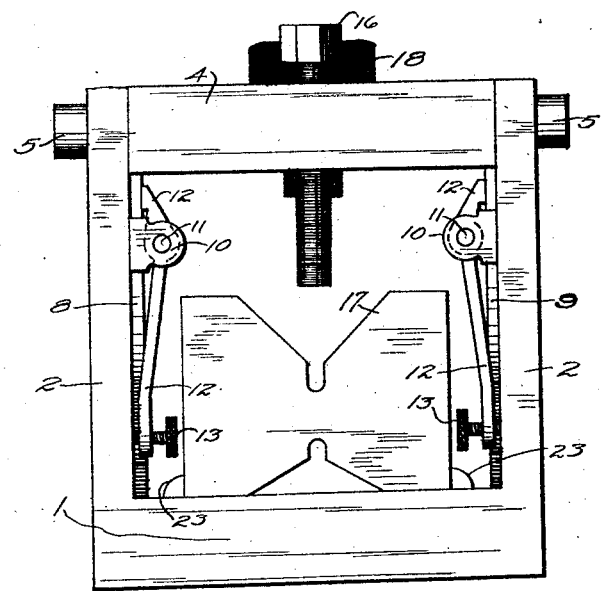

UNITED STATES PATENT OFFICE.

PER MARTIN ANDERSON, OF HARTFORD, CONNECTICUT.

WORK HOLDER.

1,415,855.  Specification of Letters Patent.  Patented May 16, 1922.

Application filed August 27, 1920. Serial No. 406,386.

*To all whom it may concern:*

Be it known that I, PER MARTIN ANDERSON, a citizen of Sweden, residing at Hartford, in the county of Hartford and State of Connecticut, have invented certain new and useful Improvements in Work Holders, of which the following is a specification.

This invention relates to improvements in universal work holders and more particularly to a work holder adapted to be clamped or otherwise secured to the table of a milling machine, drill press or planer; or to be clamped to the face plate of a lathe or screw machine to hold the work in such position as to enable it to be operated upon advantageously. With the foregoing and other objects in view the invention consists in the combination and arrangement of parts to be hereinafter fully described, pointed out in the appended claim and illustrated in the accompanying drawings which form a part of this specification and in which—

Fig. 3 is a view of the device in front elevation.

Like reference characters denote corresponding parts throughout the several views.

Figure 1:
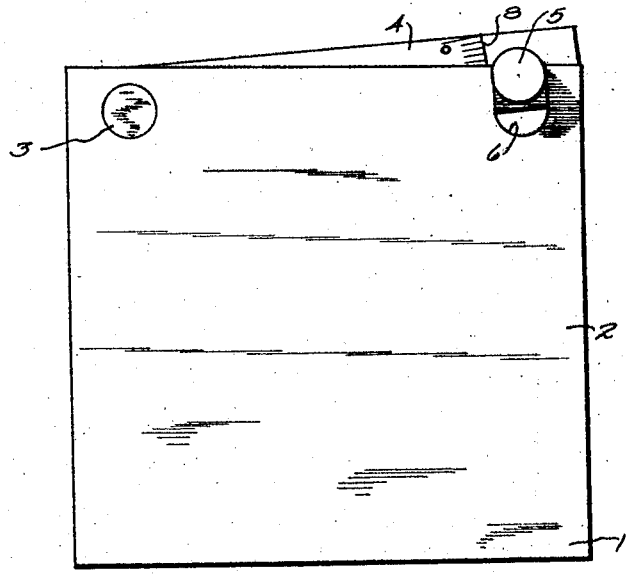
Fig. 1 is a view of my work holder in side elevation.
Figure 2:
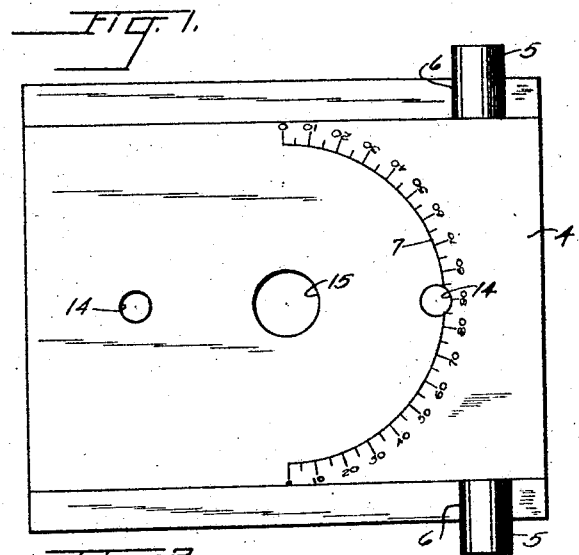
Fig. 2 is a top plan view of the same.

My work holder comprises a frame comprising the base 1 and sides 2 and open at the ends. A shaft 3 connecting the sides 2 of the frame pivotally supports the table 4 which is co-extensive with the frame-sides and which is provided with the handles 5 at one end, said handles in the normal position of the table being disposed in recesses 6 formed in the frame-sides. The table is provided also with integral arms or segments 8, 9 that depend from its lateral edges, said arms being marked off in degrees as shown; said table being formed also with graduations 7 in degrees. The segments 8, 9 with their graduations enable one to determine the inclination of the table with relation to the frame-sides. To the relatively adjacent faces of the frame-sides I secure bearings 10 in pairs, the members of each pair being connected by the pins 11 and upon each pin 11 a curved arm 12 is pivotally supported, the upper ends of said arms, above the pins 11, being adapted to bear against the segments 8, 9 to retain them in adjusted position and the lower ends of said arms 12 being perforated to receive the adjusting screw 13 carried by the frame-sides, which screws serve to move the arms 12 upon their pivots to cause them to engage with or release the segments. By means of the said arms and segments the table is retained in any adjusted position with relation to the frame-sides.

The table is formed with two small perforations 14 and with a large intermediate perforation 15, the perforations 14 being to receive the screws 16 whereby the work may be held in position against the V-block 17 removably disposed upon the base 1. While held in this position the work may be drilled, the drill (not shown) extending through the bushing 18 arranged in the perforation 15 in the table. For lathe work, mill work, etc. the table will be tilted upon its pivot 3 to position the work as desired and the segments 8, 9 are then brought into use to determine the inclination of the table. When it is desired to make a very fine and careful adjustment of the table the handles or plugs 5 are engaged by standard size-blocks or a toolmaker's high gauge and so raised. In this manner an adjustment to the one-thousandth part of an inch or less is quite possible. To the base 1 I secure a pair of parallel spaced cleats 23 which serve to retain the V-block 17 in proper position with relation to the drill bushing.

What is claimed is:—

In a work holder, a notched frame, a table having one end pivotally secured to said frame, plugs formed at the non-pivoted end of said table for disposal in the notches of said frame, oppositely disposed segments depending from the non-pivoted end of said table into said frame, means connecting said segments and frame for releasably retaining said segments in adjusted relation with said frame, and a V-block within said frame.

In testimony that I claim the foregoing as my own I have hereto affixed my signature in the presence of two subscribing witnesses.

PER MARTIN ANDERSON.

Witnesses:
GUSTAV MORTENSON,
EMMA MORTENSON.